June 16, 1964     H. R. BRUET     3,137,178
V-BELT TRANSMISSION WITH VARIABLE TRANSMISSION RATIO
Filed March 26, 1962
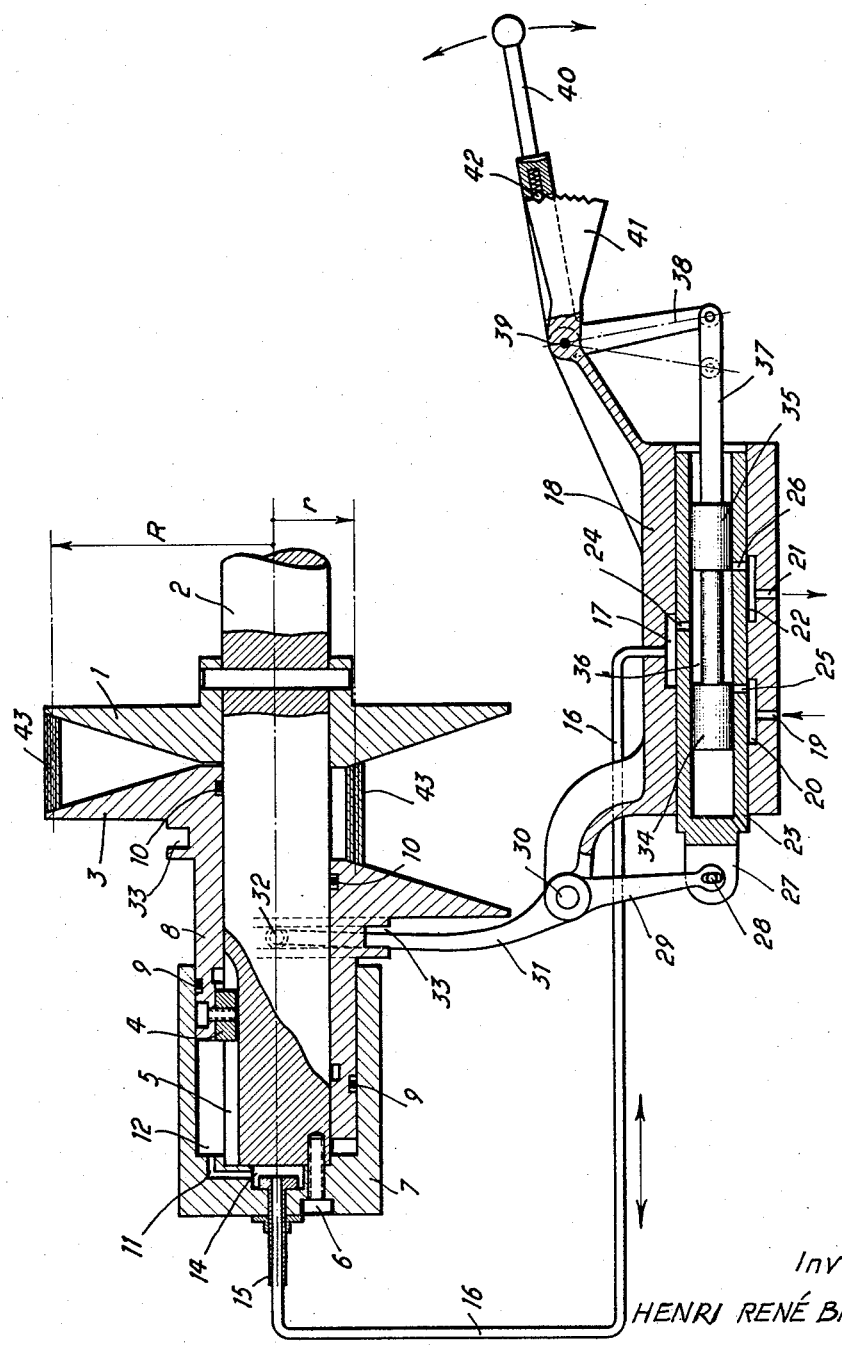
Inventor
HENRI RENÉ BRUET
By Toulmin & Toulmin
Attorneys

United States Patent Office 3,137,178
Patented June 16, 1964

3,137,178
V-BELT TRANSMISSION WITH VARIABLE
TRANSMISSION RATIO
Henri René Bruet, 14 Rue des Pyramides, Paris, France, assignor of one-half to Etablissements A. Cazeneuve, La Plaine-Saint-Denis, Seine, France, a company of France
Filed Mar. 26, 1962, Ser. No. 182,447
Claims priority, application France Apr. 4, 1961
3 Claims. (Cl. 74—230.17)

The present invention relates to speed variators having a V-belt passing round pulleys whose diameters progressively increase when their conical cheeks are moved axially toward one another by the thrust exerted by a liquid under pressure acting in a chamber carried by the pulley, the inlet into and the outlet from this chamber of the liquid being controlled by a control valve.

In these known variators, the spacing between the cheeks of the pulley, and consequently the speed ratio of the transmission, varies with the leakage of the liquid under pressure from said chamber. In order to compensate these variations, it is necessary to arrange that a speed governor acts on the control valve, but although the governor corrects more or less quickly and well these variations in the speed ratio and the variations in the speed resulting therefrom, it does not prevent them from occurring. It follows that it is not possible to obtain in this way a strictly constant speed ratio between the driving shaft and the driven shaft, which is required in numerous applications, in particular between certain machine tool shafts, and this has heretofore precluded use of this type of variator in a large number of cases.

With a view to remedy this defect a speed variator of the aforesaid kind has been improved as described in my Patent No. 3,014,378 according to which the speed ratio of the transmission it affords depends on the position of the control element, owing to the fact that said valve controlling the inlet of the fluid under pressure into said chamber and the outlet thereof from the latter is constituted by a distributor of the type used in hydraulic control mechanisms, namely of the type effecting the control of the passage of the liquid by the relative position of two movable elements, of which one is the pilot element acting as a control element and the other, a follow-up element, whose position is made dependent on that imparted by said thrust of the fluid under pressure in said chamber to the element to be actuated, the position of the follow-up element being therefore determined in the present instance by the relative position of the cheeks.

The essential advantage of this fundamental arrangement is that the speed ratio of the transmission is determined in a strict manner by the position given to the control element, which thus eliminates any variation in this speed ratio irrespective of the variations in the liquid pressure; this ratio remains strictly constant so long as the position given to the control element is maintained. This improvement renders the aforementioned type of variators of utility in fields in which they were heretofore unsuitable, such as those mentioned hereinbefore.

The present invention relates to a specific embodiment of the invention which differs from the embodiment described in said patent. In this novel embodiment, which is advantageous owing to its great simplicity, the body of the distributor is outside the pulley and is an independent unit. In this case, it is well that this body of the distributor carries the control lever of the pilot element of the follow-up valve, for example a pivotal lever having a stop member movable along a toothed sector, and the connecting means rendering the position of the follow-up element dependent on that of the movable cheek of the pulley, for example a lever having two arms pivoted to the body of the distributor, one of which arms terminates in a fork end engaged in a recess in the hub of the movable cheek of the pulley.

It is furthermore advantageous that the chamber provided on the pulley for receiving the liquid fluid under pressure be closed by a sleeve fixed to the end of the shaft on which the pulley is keyed, said sleeve slidably encasing in a fluid-tight manner the hub of the cheek slidable on this shaft and thus defining with the shaft and said hub the chamber with which communicates a pipe which extends through the centre of the end wall of said sleeve and connects the chamber to the fixed body of said distributor outside the pulley.

By way of a non-restrictive example, the accompanying drawing shows diagrammatically a particular embodiment of a variator having the aforementioned features.

In the drawing:

The single figure is a sectional view, partly diagrammatic, of a pulley having a variable diameter and a distributor of a fluid under pressure, the upper half-sectional view of the pulley showing the cheeks moved toward one another to the maximum extent and the lower half-sectional view showing these cheeks separated to the maximum extent.

This figure shows the cheek 1 rigid with the driving shaft 2 on which is slidable the controlled cheek 3 which is connected, as concerns rotation, to the shaft 2 by the key 4 fitted in the keyway 5 (or by any other arrangement). Centered on and fixed to, the end of the shaft 2 by screws, such as 6, is a cylinder or sleeve 7 which caps the hub 8 of the cheek 3 which hub is so arranged as to constitute an annular piston having sealing rings 9 and 10. Pipes, such as 11, put the annular cylinder 12 in communication with a central bore 14 into which discharges the end connector 15 of a fixed pipe 16 (through which flows the fluid under pressure) leading to a cavity 17 in the main body 18 (fixed) of the distributor. This main body 18 is also provided with an inlet 19 for the fluid under pressure which communicates with a cavity 20 and with a fluid outlet 21 communicating with a cavity 22. A cylinder 23 slidably mounted in the main body 18 with suitable fluid tightness is provided with apertures 25 and 26 which communicate with the cavities 20 and 22. The left end of the cylinder 23 constitutes a fork 27 to which is coupled by a pin 28 the end of the branch or arm 29 of a lever pivoted to a pin 30 whose other arm 31 has journals 32 engaged in a recess 33 provided on the controlled cheek 3.

Slidable in the cylinder 23, which is suitably bored, is a piston having two bodies 34 and 35 and a control rod 37. The two bodies 34 and 35 are separated by an annular recess 36 whose length is at the most equal to the distance between the right and left edges of the apertures 25 and 26. The rod 37 of the piston is connected to the arm 38 of a lever pivotably mounted at 39 and whose other arm 40 moves along a toothed or notched sector 41 an elastically yieldable stop pin 42 which permits fixing the position of the piston 34, 35, 37 when the lever 38, 40 has been shifted. A V-belt 43 is passed around the expansible pulley constituted by the cheeks 1 and 3.

In the valve arrangement thus provided by body 18, cylinder 23 and piston 34, 35 the latter forms a pilot valve member and cylinder 23 a pilot following member.

The speed ratio is strictly controlled by the position of the lever 38, 40 in the following manner:

The driving shaft 2 rotates and drives, through the medium of the cheeks 1 and 3 of the expansible pulley, the belt 43 which passes round another conjugate pulley which is for example similar to the pulley 1, 3.

In the position shown in the figure, the bodies 34 and 37 of the piston, a pilot valve member within the cylinder 23 or pilot following member close the apertures 25 and 26 and the fluid, for example oil, is trapped in the recess 36, the apertures 24, the cavity 17, the pipe 16, the central bore 14 and the annular cylinder 12. This oil, which is practically incompressible, opposes the thrust exerted reactionally by the belt 43 which tends to shift the cheek 3 toward the left as viewed in the figure.

However, if a leakage occurs, this shifting toward the left of the cheek 3 could take place and this would result in its recess 33 shifting the journals 32 of the lever 29, 31 which would pivot about the pin 30 and urge by its end 28 the pilot following member 23 toward the right side of the figure. The apertures 25 thus pass the edge of the body 34 of the piston 34, 35, 37, which is held stationary by the sector 41, and communicate with the recess 36 which allows through the oil under pressure passing through the aperture 19 and acting through the pipe 16 on the annular face, which constitutes a piston 8, of the hub of the cheek 3 which latter is immediately returned to its original position in which it stops, since, in its movement, the recess 33 shifts the lever 29, 31 whose end 28 draws the pilot following member 23 toward the left side of the figure which returns the apertures 25 to the position in which they are closed by the body 34 of the piston 34, 35, 37 which remained stationary and which thus ensures, by its position, that the cheek 3 remains in the position chosen therefor and consequently determines the constant radius at which the belt 43 is passed round the pulley.

Thus any abnormal displacements of the cheek 3 due to leakage of liquid or any other cause are automatically corrected.

If the lever 38, 40 is actuated so as to shift the piston 34, 35, 37 toward the left side of the figure, the body 34 of the pilot valve member uncovers the apertures 25 and this allows through the liquid under pressure coming from the aperture 19, while the apertures 26 remain closed by the body 34 of said pilot valve member.

This fluid then exerts a thrust on the annular face of the hub 8 of the cheek 3 which is urged back and approaches the cheek 1 and increases the radius at which the belt 43 is passed round the pulley, which radius is variable from a minimum $r$ to a maximum $R$ in assuming all the intermediate radii determined, for example, by a suitable notching of the sector 41 or by a progressive blocking on a similar sector.

Conversely, in shifting the pilot valve member 34, 35, 37 toward the left side of the figure, the body 35 of this member uncovers the apertures 26 leading to the liquid outlet 21 while the body 34 of the pilot valve member closes the apertures 25 corresponding to the liquid inlet, which liquid can then be expelled by the annular piston 8 urged back by the reaction of the belt 43 on the cheek 3. As soon as the pilot valve member 34, 35, 37 is stationary, the pilot following member 23, which in being actuated by the lever 29, 31 followed its movement, closes the liquid outlet apertures 26 by means of the body 35 of the piston, which determines the position in which the cheek 3 is stopped and consequently the fixed radius at which the belt 43 is passed round the pulley.

It must be understood that the scope of the invention is in no way restricted to the details of the embodiment shown or described, which have been given merely by way of example. Thus, the distributor could be of any type other than that having a slide or piston moving in a straight line, etc.

What I claim is:

1. In a V-belt transmission with variable transmission ratio, including a pulley having an axially movable pulley cheek and provided with a variable volume chamber adapted to receive a liquid under pressure, the actual chamber volume and the actual axial position of said movable cheek depending upon one another, and means including a control valve and a pipe connection between said chamber and said valve for fluid supply and escape to and from said chamber, said movable pulley cheek being provided on one side with a coaxially disposed hub, a driving rotatable shaft slidably extended through said hub and cheek and slidably keyed to said hub, said shaft projecting from said hub and cheek on one and the other side thereof, a sleeve externally fitted onto said hub and defining an annular recess with said shaft end projecting from the hub, said sleeve having a transverse bottom secured to said shaft end projecting from the hub, whereby said variable volume chamber is constituted by the annular recess provided between said shaft, said sleeve, the bottom thereof and the end of said hub within said sleeve, an external pipe, an axial rotary joint connection through said bottom between said external pipe and said variable volume chamber, said control valve comprising a casing having an inner cavity in permanent connection with said pipe and therethrough with said chamber, a fluid inlet, a fluid outlet and valve means for selectively connecting said inlet and outlet with said cavity, said valve means comprising a pilot valve member and a pilot following valve member, and means operatively connecting said movable pulley cheek and following valve member together so that the actual position of the latter depends upon the actual position of said movable pulley cheek.

2. In a V-belt transmission as in claim 1, the inner side of said sleeve bottom being in engagement with the end face of said shaft and being provided with an axial and blind recess in communication with said annular recess, and said rotary joint connection opening into said axial recess.

3. In a V-belt transmission as in claim 1, the inner side of said sleeve bottom being centrally recessed whereby said sleeve is fitted over said shaft end projecting from the hub.

References Cited in the file of this patent

UNITED STATES PATENTS

| | | |
|---|---|---|
| 2,295,161 | Clay | Sept. 8, 1942 |
| 2,363,179 | Harrington et al. | Nov. 21, 1944 |
| 2,993,385 | Karig et al. | July 25, 1961 |
| 3,014,378 | Bruet | Dec. 26, 1961 |
| 3,017,783 | Van der Brugghen et al. | Jan. 23, 1962 |